United States Patent
Takakuwa

(10) Patent No.: US 7,064,775 B2
(45) Date of Patent: Jun. 20, 2006

(54) CAMERA WITH IMAGE RECORDING MODE SWITCHING FUNCTION

(75) Inventor: Makoto Takakuwa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 728 days.

(21) Appl. No.: 10/351,426

(22) Filed: Jan. 24, 2003

(65) Prior Publication Data

US 2003/0142221 A1 Jul. 31, 2003

(30) Foreign Application Priority Data

Jan. 25, 2002 (JP) ............... P.2002-016976

(51) Int. Cl.
*B41J 2/385* (2006.01)
(52) U.S. Cl. .................... 348/164; 348/273
(58) Field of Classification Search ............... None
See application file for complete search history.

(56) References Cited

U.S. PATENT DOCUMENTS

2002/0152557 A1* 10/2002 Elberbaum .................. 8/405

FOREIGN PATENT DOCUMENTS

| JP | 2-272986 | 11/1990 |
|---|---|---|
| JP | 2000-69463 | 3/2000 |
| JP | 2001-45512 | 2/2001 |

\* cited by examiner

*Primary Examiner*—Ngoc-Yen Vu
*Assistant Examiner*—Anthony J. Daniels
(74) *Attorney, Agent, or Firm*—Pearne & Gordon LLP

(57) ABSTRACT

To provide a camera with an image switching function capable of assuredly recording mode preventing the generation of a hunting upon switching the image recording mode, an image pick-up signal obtained by a CCD image pick-up element 1% is outputted as a color video signal or a black-and-white video signal in accordance with an image recording mode through processes by an analog signal processing part 2, an A/D converting part 3, a digital signal processing part 4 and a video output part 5. A control part 6 controls all the operations of a camera including process determining the image record mode. The image record mode basically determined in accordance a luminance signal. The image record mode is set to a color image record mode under a high luminance and set to a black-and-white image record mode under a low luminance. However, when the image pick-up signal is formed under near infrared radiation even high luminance, the image record mode is set to the black-and-white image record mode. Whether or not the image pick-up signal is formed by the near infrared radiation is decided by analyzing color signals of image pick-up signal.

5 Claims, 6 Drawing Sheets

CAMERA WITH IMAGE RECORDING MODE SWITCHING FUNCTION

BACKGROUND OF THE INVENTION

1. Field of the Invention

The present invention relates to a camera capable of switching an image record mode.

2. Description of the Related Art

As an example of related art of a camera having an image record mode switching function, a "black-and-white/color switching camera" is disclosed in JP-A-2001-45512. This camera employs a CCD as a solid-state image pick-up element. The sensitivity characteristics of the CCD have such characteristics as shown by a curve a shown in FIG. 6. When the camera is used as a color camera, since the wave length up to about 650 nm can be sensed by the eyes of a human being and a color reproducibility needs to be improved, an infrared radiation cut filter is arranged in the front surface of the CCD. The sensitivity characteristics of the CCD at this time are shown by a curve b shown in FIG. 6. On the other hand, when the camera is used as a black-and-white camera, since the improvement of sensitivity and the color reproducibility are hardly affected, the infrared radiation cut filter is removed.

Here, for instance, when a color mode shifts to a black-and-white mode (in the evening or it is assumed that the luminance of an interior lighting falls), after an image recording mode is decided on the basis of a luminance value, the infrared radiation cut filter is removed. At this time, as apparent from FIG. 6, an image pick-up signal in an infrared radiation area (720 nm or higher) is also added, so that the sensitivity is temporarily raised to increase the luminance value of the image pick-up signal, and, what is called a hunting phenomenon is generated in which a series of operations (a color mode to a black-and-white mode to a color mode to . . . ) that the image recording mode is apt to shift to an original color mode are repeated. This hunting phenomenon is likewise generated when the black-and-white mode shifts to the color mode (at dawn or it is assumed that the luminance of an interior lighting increases). In the black-and-white/color switching camera disclosed in the above publication, for preventing the hunting operation, one threshold value of a luminance level (it is abbreviated as Y1, hereinafter) when the black-and-white mode is switched to the color mode and two threshold values of a luminance level (they are abbreviated as Y2 and Y3, hereinafter) when the color mode is switched to the black-and-white mode are provided and the threshold values are respectively set to satisfy the relations that Y2 is larger than Y1, Y3 is larger than Y1 and Y2 is not equal to Y3 to prevent the hunting.

However, in the black-and-white/color switching camera of the related art, since the luminance levels upon recording an image under the black-and-white mode are greatly different depending on the presence or absence of illumination light and the kinds thereof, the respective threshold values, that is, Y1, Y2 and Y3 cannot be properly determined with ease and a hunting phenomenon cannot be inconveniently assuredly prevented.

SUMMARY OF INVENTION

The present invention was proposed to solve the conventional problems and it is an object of the present invention to provide a camera with an image recording mode switching function capable of assuredly preventing the generation of a hunting phenomenon upon switching an image recording mode.

A camera with an image recording mode switching function according to the present invention comprises: an image pick-up part for recording an image of an object to be recorded or photographed; a mode determining part for determining the image recording mode on the basis of a luminance signal and color signals of an image pick-up signal obtained from the image pick-up part; and a video signal output part for outputting a color video signal or a black-and-white video signal based on the image pick-up signal in accordance with the image recording mode determined by the mode determining part. With such a configuration, since the kind of a light source of the image pick-up signal can be specified by using the ratios of the color signals, the generation of the hunting upon switching the image recording mode can be assuredly prevented.

Further, in the camera with an image recording mode switching function according to the present invention, the mode determining part discriminates whether or not the image pick-up signal is formed by a near infrared radiation based on the color signals to determine the image recording mode. With such a configuration, since the light source of the image pick-up signal can be specified to be composed of the near infrared radiation, the hunting can be prevented when the near infrared radiation is employed as lighting.

Further, in the camera with an image recording mode switching function according to the present invention, the mode determining part determines the image recording mode based on whether or not the values of the ratios of the color signals of three primary colors of the image pick-up signal are located within predetermined ranges. With such a configuration, since the light source of the image pick-up signal can be specified to be composed of the near infrared radiation, the hunting can be prevented when the near infrared radiation is employed as lighting.

Further, in the camera with an image recording mode switching function according to the present invention, the mode determining part discriminates whether or not the image pick-up signal is formed by the near infrared radiation for each of a plurality of blocks obtained by dividing an image pick-up screen into a plurality of parts and determines the image recording mode by using the number of the blocks in which the image pick-up signal is formed by the near infrared radiation. With such a configuration, the hunting can be prevented even when there is a partial lighting.

Still further, in the camera with an image recording mode switching function according to the present invention, the mode determining part determines the image record mode by using the image pick-up signal for a preset prescribed period. With such a configuration, even when a recorded image is singularly changed during a prescribed period, the hunting can be prevented.

Furthermore, the camera with an image recording mode switching function according to the present invention includes a prescribed period setting part capable of arbitrarily setting the prescribed period. According to such a configuration, even when a recorded image is singularly changed during an arbitrary prescribed period, the hunting can be prevented.

DESCRIPTION OF THE PREFERRED EMBODIMENTS

Figure 1:
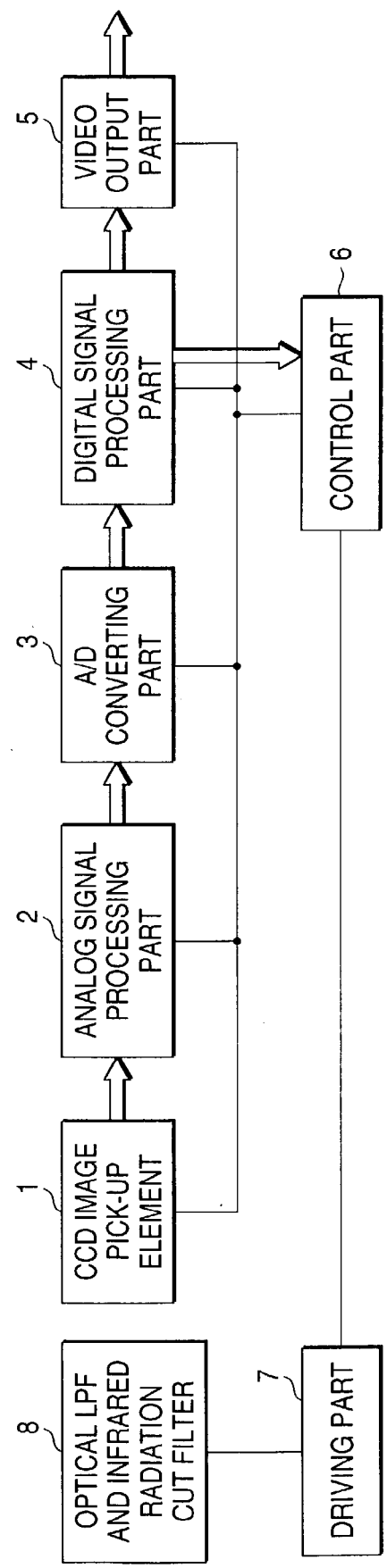
FIG. 1 is a diagram showing a schematic structure of a camera according to an embodiment of the present invention.

Now, an embodiment of the present invention will be described below by referring to the drawings. A camera with an image recording mode switching function is shown in FIG. 1.

In FIG. 1, a CCD image pick-up element 1 includes a photoelectric transfer part and a charge transfer part and outputs the information of a picked-up image to be recorded or photographed as an analog signal. On the light receive surface of the photoelectric transfer part, color filters are arranged in prescribed order for each pixel and color information is included in the outputted analog signal. An analog signal processing part 2 applies prescribed analog processes (a noise removal, a gain control, a pre-knee process, etc.) to the signal outputted from the CCD image pick-up element 1. An A/D converting part 3 converts an analog image pick-up signal from the analog signal processing part 2 into a digital signal.

A digital signal processing part 4 includes a DPS and applies a prescribed process to the digital image pick-up signal from the A/D converting part 3 to output a luminance signal and color signals for each pixel. A video output part 5 generates and outputs a color video signal or a black-and-white video signal by using the output signals from the digital signal processing part 4. Whether the color video signal is generated or the black-and-white video signal is generated is determined depending on an image recording mode signal from a control part 6 having also a function as a mode determining part.

The control part 6 controls all the operations of the camera including a process for determining the image recording mode and is composed of a processor operated by a prescribed program as a main body. The process for determining the image record mode will be described below.

A driving part 7 serves to drive an optical LPF and an infrared radiation cut filter 8 in accordance with a control signal of the control part 6. The optical LPF and the infrared radiation cut filter 8 are arranged in the front surface of the CCD image pick-up element 1 at the time of the color image recording mode. The optical LPF serves to cut the high frequency zone of the recorded image and remove a false color or the like. The infrared radiation cut filter serves to cut the infrared radiation component of light incident on the CCD image pick-up element 1.

The operation of the camera with an image recording mode switching function constructed as mentioned above is described below. The image pick-up signal obtained in the CCD image pick-up element 1 is outputted as the video signal through the processes by the analog signal processing part 2, the A/D converting part 3, the digital signal processing part 4 and the video output part 5. When the image recording mode is the color image recording mode, the optical LPF and the infrared radiation cut filter 8 are arranged in the front surface of the CCD image pick-up element 1 and the video output part 5 outputs the color video signal. Further, when the image recording mode is a black-and-white mode, the optical LPF and the infrared radiation cut filter 8 are removed from the front surface of the CCD image pick-up element 1 and the video output part 5 outputs the black-and-white video signal.

Now, the process for determining the image record mode will be described. The digital signal processing part 4 calculates the luminance signal of the image pick-up signal and the color signals of three primary colors irrespective of the image recording mode and outputs the luminance signal and the color signals to the control part 6. The control part 6 determines the image record mode on the basis of the luminance signal and the color signals of the image pick-up signal. The image record mode is basically determined by the luminance signal. That is, the image record mode is the color mode upon high luminance and the image record mode is the black-and-white mode upon low luminance. In this connection, when the image pick-up signal is formed by near infrared radiation light even at the time of the high luminance, the image recor mode needs to be set to the black-and-white mode.

Figure 2:
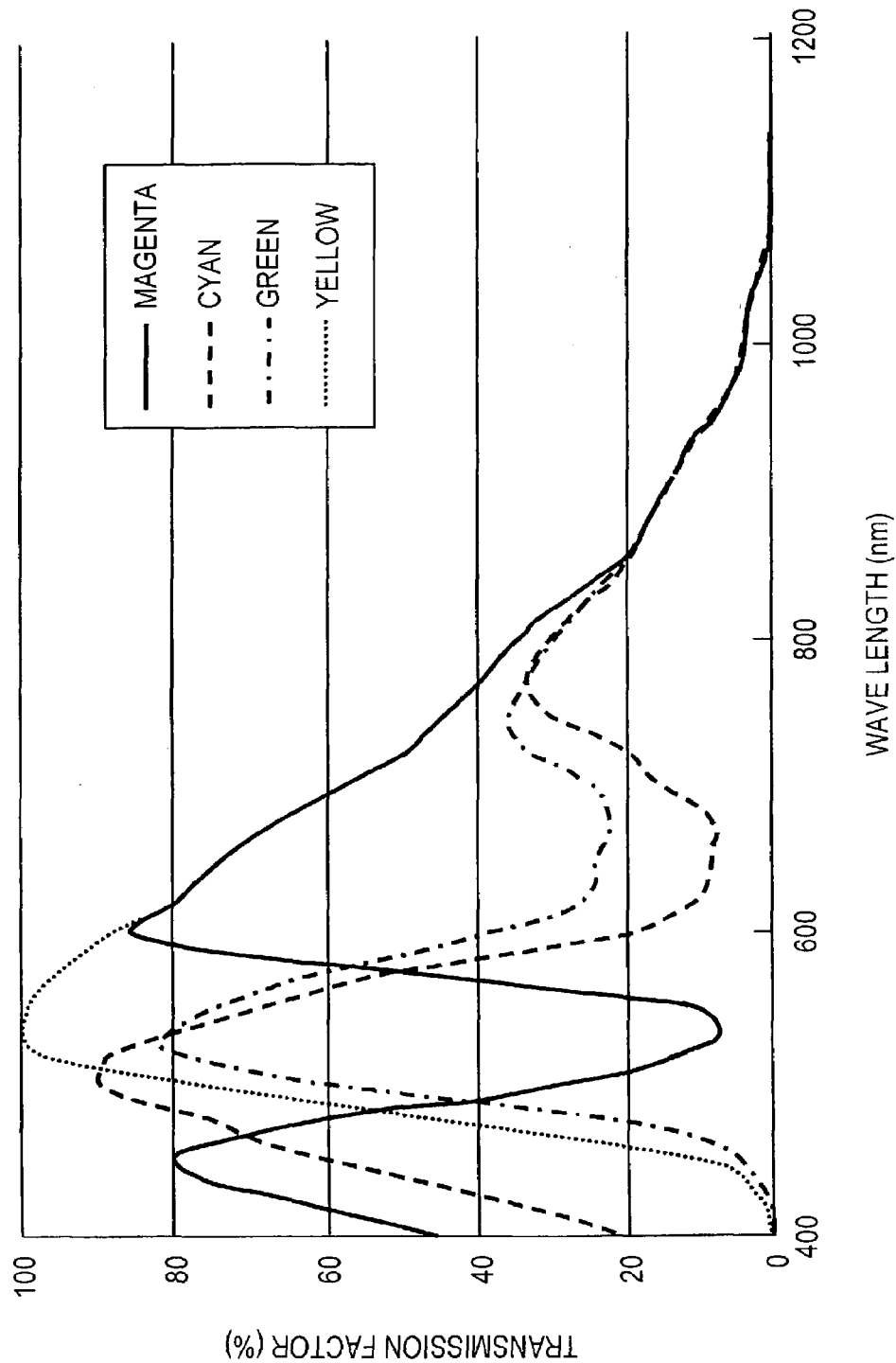
FIG. 2 is a diagram showing sensitivity characteristics for each color of a CCD image pick-up element.

Whether or not the image pick-up signal is formed by the near infrared radiation is decided by analyzing the color signals of the image pick-up signal. A principle thereof is described below. FIG. 2 shows the sensitivity characteristics of each color of the CCD image pick-up element. As shown in FIG. 2, the sensitivity of the CCD image pick-up element is substantially the same for long wave-length in the vicinity of 800 [nm] irrespective of the kinds of colors. While FIG. 2 shows the examples of complementary colors, examples of primary colors (R(red), G(green) and B(blue)) likewise show the same results. Therefore, since the ratio of the color signals of three primary colors of the image pick-up signal formed by the near infrared radiation is substantially constant irrespective of the color of an object whose image is recorded or photographed, the ratio of the color signals composed of the three primary colors is obtained so that whether or not the image pick-up signal is formed by the near infrared radiation can be decided. Specifically, when the ratio of a component R to a component G (abbreviate it as R/G, hereinafter) substantially corresponds to the ratio of a component B to a component G (abbreviate it as B/G, hereinafter), the image pick-up signal is decided to be formed by the near infrared radiation.

While, as the luminance signal and the color signals of the image pick-up signal used for deciding whether or not the image pick-up signal is formed by the near infrared radiation, while average values of all of an image pick-up screen are simply employed, the image pick-up screen may be divided into a plurality of blocks (for example, 6 for length×8 for width =48 blocks) and an average luminance signal and average color signals of each block may be used to more precisely decide whether or not the image pick-up signal is formed with the near infrared radiation.

Figure 3:
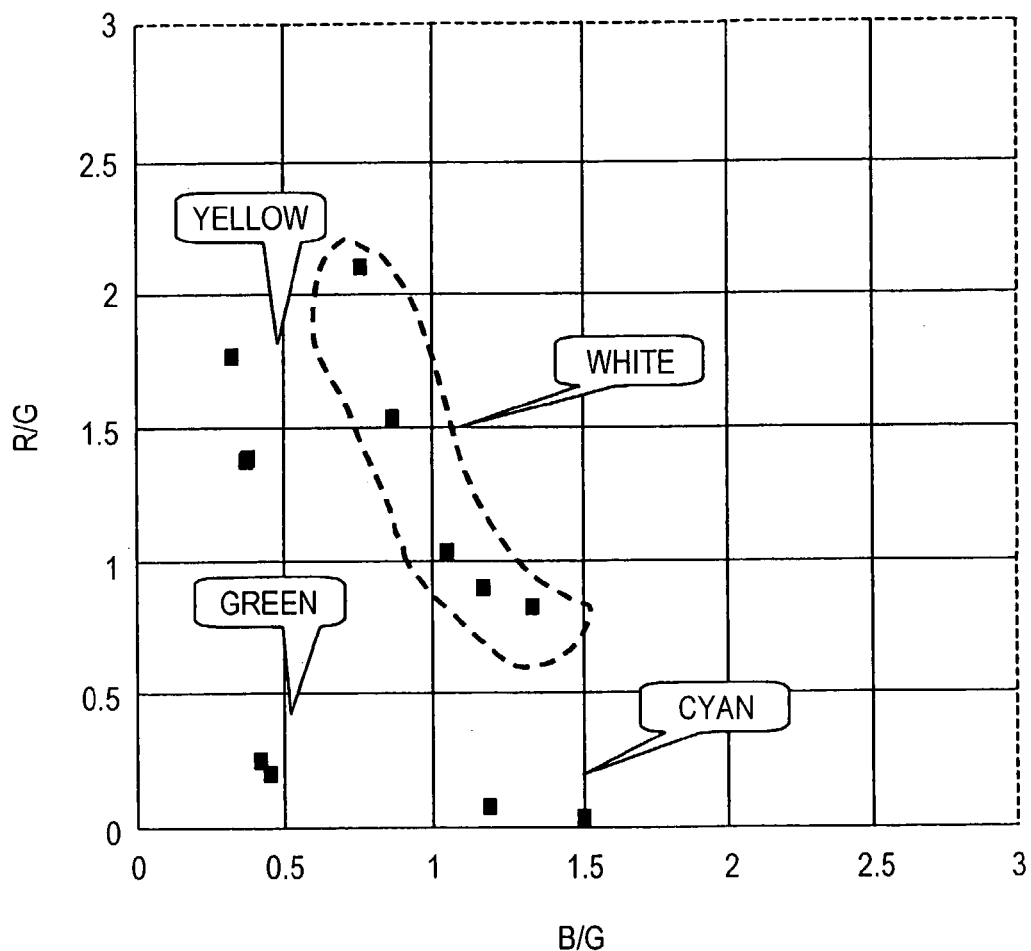
FIG. 3 is a diagram showing that R/G and B/G of an image recorded under visible lights are plotted.
Figure 4:
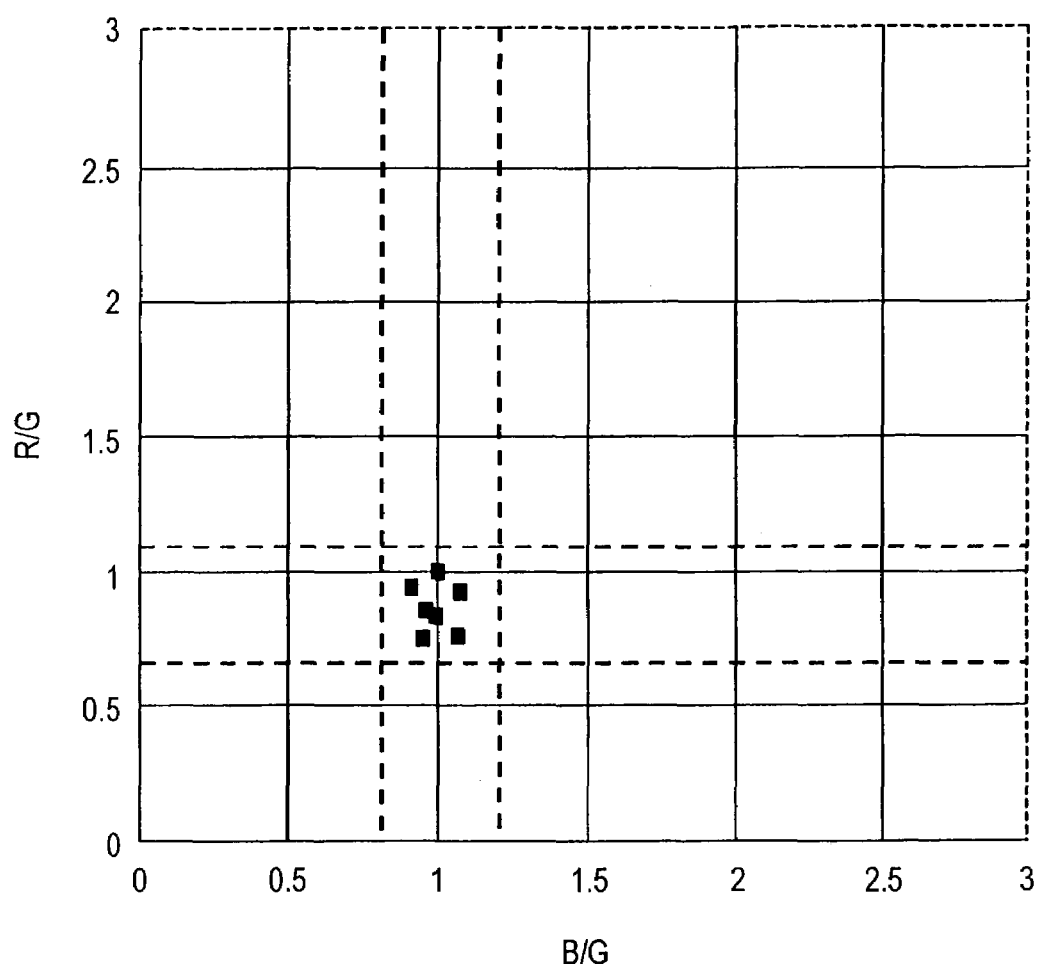
FIG. 4 is a diagram showing that R/G and B/G of an image recorded under near infrared radiation are plotted.

FIGS. 3 and 4 are diagrams showing that R/G and B/G are obtained for the recorded or photographed image by visible lights and the near infrared radiation on the basis of the color signals for each block and they are plotted. As apparent from FIG. 3, the recorded image by the visible lights is unevenly plotted. On the other hand, in the recorded image by the near infrared radiation, R/G is larger than 0.7 and smaller 1.1 and B/G is larger than 0.8 and smaller than 1.2. Accordingly, whether or not the image pick-up signal is formed by the near infrared radiation can be decided on the basis of the number of blocks included in the above-described ranges. At that time, for the blocks the average luminance of which is not lower than a prescribed value, whether or not the ratios of the color signals are included in the above-described ranges are decided to precisely decide whether the image pick-up signal is formed by the near infrared radiation irrespective of image recording or photographing conditions such as the kinds or the arrangements of lighting, the presence and absence of natural light, etc. Since the above-described numerical ranges depend on the maker and the kind of the CCD image pick-up element, and the processing parameters of the digital signal processing part, etc., they practically need to be determined for each type of camera.

Figure 5:
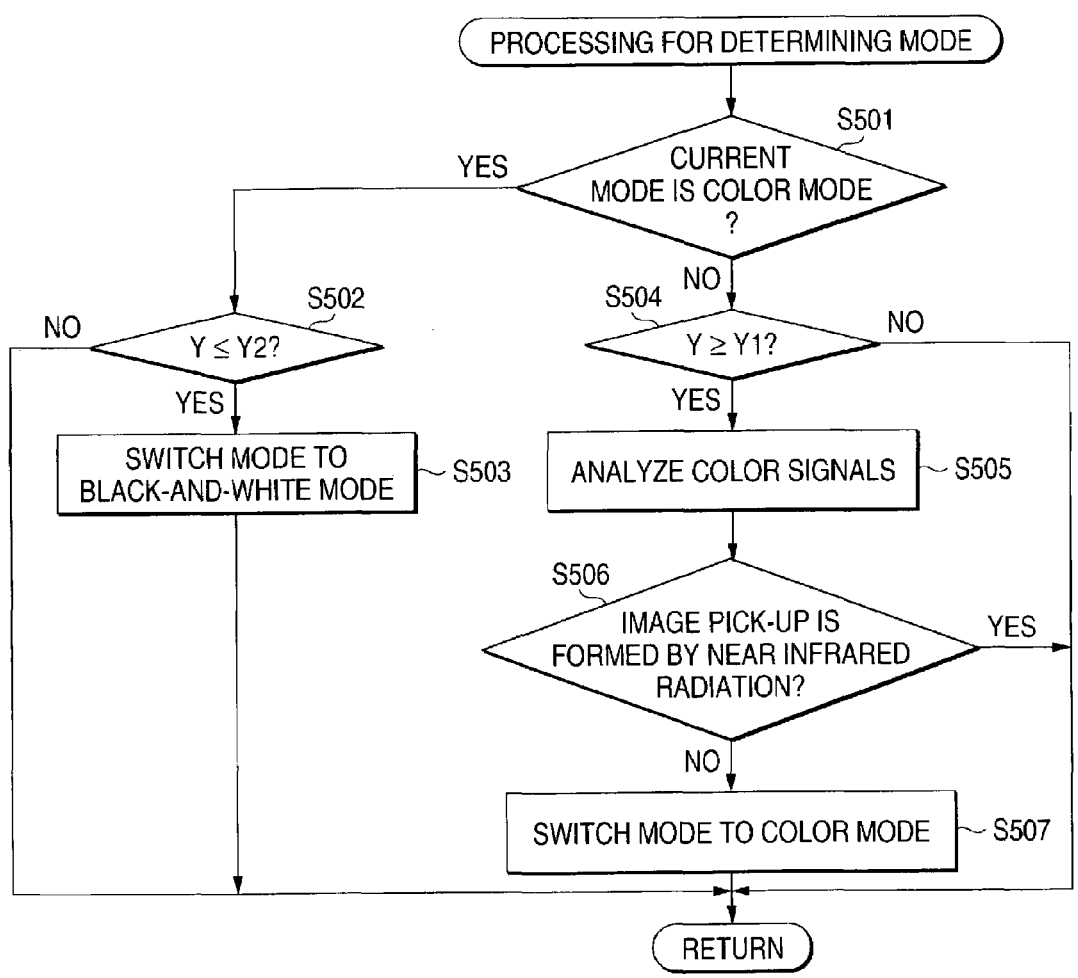
FIG. 5 is a diagram showing a flow of a process for determining an image recording mode of the camera according to the embodiment of the present invention.

Subsequently, the process for determining the image recording mode of the camera shown in FIG. 1 will be described by referring to a flow chart shown in FIG. 5. A mode determining process is carried out at a predetermined timing by using the luminance signal Y and the color signals R, G and B of the image pick-up signal. In FIG. 5, the image record mode is simply designated as a mode.

In step 501, a current image record mode is discriminated. When the image recording mode is a color image recording mode, whether or not a luminance signal Y is larger than a preset threshold value Y2 is discriminated in step 502. When Y is not larger than Y2, the illuminance of an object whose image is recorded or photographed is low, so that the image record mode is switched to a black-and-white image recording mode (step 503). When Y is larger than Y2, it is decided that the illuminance of the object whose image is recorded or photographed is adequate, and the image record mode remains to be the color image record mode.

In the step 501, when it is decided that the current image recording mode is the black-and-white image recording mode, whether or not the luminance signal Y is larger than a preset threshold value Y1 is discriminated in step 504. In this connection, in the threshold values Y1 and Y2, Y1 is set to be larger than Y2. A reason why the threshold values are set as described above is to avoid a phenomenon that the luminance signal is increased as a result of removal of the infrared radiation cut filter to possibly generate a hunting even under the lighting by the visible radiation. Y1 may be equal to Y2 depending on using conditions, however, in that case, the image recording mode is switched to the black-and-white image recording mode when Y is smaller than Y1 in the step 502.

In the step 504, when Y is smaller than Y1, the illuminance of the object whose image is recorded or photographed is low. Accordingly, the image record mode remains to be the black-and-white image record mode. Further, when Y is not smaller than Y1, the color signals are analyzed (step 505). The color signals are analyzed in order to decide whether or not the image pick-up signal is formed by the near infrared radiation and analyze R/G and B/G. Then, whether or not the image pick-up signal is formed by the near infrared radiation is decided on the basis of the analyzed results (step 506).

In the step 506, when it is decided that the image pick-up signal is formed by the near infrared radiation, the image record mode remains to be the black-and-white image recording mode. That is, most of the luminance signal of the image pick-up signal is formed by a near infrared radiation lighting. Thus, when the image record mode is directly switched to the color image record mode, a luminance is abruptly decreased so that the hunting may be possibly generated. Accordingly, the image record mode remains to be the black-and-white image recording mode. On the other hand, when it is decided that the image pick-up signal is not formed by the near infrared radiation in the step 506, since the illuminance of the object whose image is recorded or photographed by the visible lights is sufficient, the image recording mode is switched to the color image recording mode in step 507.

Accordingly, when the image recording mode is determined in accordance with the flow chart as shown in FIG. 5, the generation of the hunting can be assuredly prevented upon switching the image recording mode without directly recognizing the presence or absence, the kind and the operating state of a lighting device.

In the flowchart shown in FIG. 5, whether or not the luminance signal Y is larger or smaller than the threshold value Y1 or Y2 may be discriminated and the color signals may be analyzed by using either the average value of all an image pick-up screen or average values in blocks obtained by dividing the image pick-up screen.

When it is discriminated whether the luminance signal is larger or smaller than the threshold values by using the average values in the blocks, an average luminance is compared with the threshold value Y1 or Y2 for each block. When the number of blocks which satisfy a prescribed condition (for instance, Y is not smaller than Y1 in the step 504) has a prescribed rate or more (for instance, 70%) relative to all the number of blocks, it is decided that the condition is satisfied.

When the color signals are analyzed by using the average values in the blocks, the number of blocks in which R/G and B/G are included in the prescribed ranges is analyzed as described above. Then, whether or not the image pick-up signal is formed by the near infrared radiation is decided in accordance with the number of blocks in which R/G and G/B are included in the prescribed ranges. The reference number of blocks for deciding whether or not the image pick-up signal is formed by the near infrared radiation may be considered to be the number of blocks of all the image pick-up screen, however, a precise decision may not be possibly made under a partial lighting. In order to avoid such an inconvenience, the color signals are analyzed for the blocks in which the average luminance signal has a prescribed value or larger. Then, whether or not the image pick-up signal is formed by the near infrared radiation is decided in accordance with whether or not the number of blocks in which R/G and B/G are included in the prescribed ranges satisfies a prescribed relation (for instance, the difference between both the numbers of blocks is 7 or smaller) relative to the number of blocks in which the average luminance signal has the prescribed value or larger. When it is discriminated whether or not the luminance signal is larger or smaller than the threshold values and the color signals are analyzed by using the average values in the blocks, as described above, the hunting can be prevented even when there is a partial lighting.

In the above description, although the process for determining the image recording mode is carried out by employing the image pick-up signal of one frame, the image recording modes may be obtained for the image pick-up signals of a plurality of frames for a predescribed period suitably determined, depending on a predetermined fixed period or causing state, by the control part 6 which has also a function as a prescribed period setting part, and then, the mode may be switched when they mutually correspond, in order to prevent the image recording mode from being switched due to a singular change of a recorded image (for instance, an illumination by a headlight of a motor vehicle upon image recording at night, a temporary shadow, etc.). In that case, the number of frames of images (the number of frames) is properly determined in accordance with using conditions.

When the image recording mode is determined by using the image pick-up signals of the plural frames, the hunting can be prevented even when the recorded or photographed image is singularly changed during the prescribed period (in other words, time required for determining the image recording mode).

As described above, according to the present invention, the camera with an image recording mode switching function in which the generation of a hunting can be assuredly prevented upon switching the image recording mode can be provided.

What is claimed is:

1. A camera with an image recording mode switching function capable switching an image recording mode, said camera comprising:
    an image pick-up part for recording an image of an object be recorded or photographed;
    a mode determining part for determining the image recording mode on the basis luminance signal and color signals of an image pick-up signal obtained from the image pick-up part, wherein the mode determining part discriminates whether or not the image-pickup signal is formed by a near infrared radiation based on the color signals to determine the image recording mode; and a video signal output part for outputting a color video signal or a black-and-white video signal based on the image pick-up signal accordance with the image recording mode determined by the mode determining part.

2. A camera with an image recording mode switching function according to claim 1, characterized in that the mode determining part determines the image recording mode based on whether or not the values of the ratios of the color signals of three primary colors of the image pick-up signal are located within preset ranges.

3. A camera with an image recording mode switching function according to claim 1, characterized that the mode determining part discriminates whether or not the image pick-up signal formed by the near infrared radiation for each of a plurality of blocks obtained by dividing an image pick-up screen and determines the image recording mode by using the number of the blocks in which the image pick-up signals are formed by the near infrared radiation.

4. A camera with an image recording mode switching function according to any one of claims 1, 2 or 3, characterized in that the mode determining part determines the image recording mode by using the image pick-up signal for a preset prescribed period.

5. A camera with an image recording mode switching function according to claim 4, further including a prescribed period setting part capable of arbitrarily setting the prescribed period.

* * * * *

UNITED STATES PATENT AND TRADEMARK OFFICE
CERTIFICATE OF CORRECTION

| | | |
|---|---|---|
| PATENT NO. | : 7,064,775 B2 | Page 1 of 1 |
| APPLICATION NO. | : 10/351426 | |
| DATED | : June 20, 2006 | |
| INVENTOR(S) | : Makoto Takakuwa | |

It is certified that error appears in the above-identified patent and that said Letters Patent is hereby corrected as shown below:

In the Abstract, Line 5, after "element 1" please delete "%"

Figure 6:
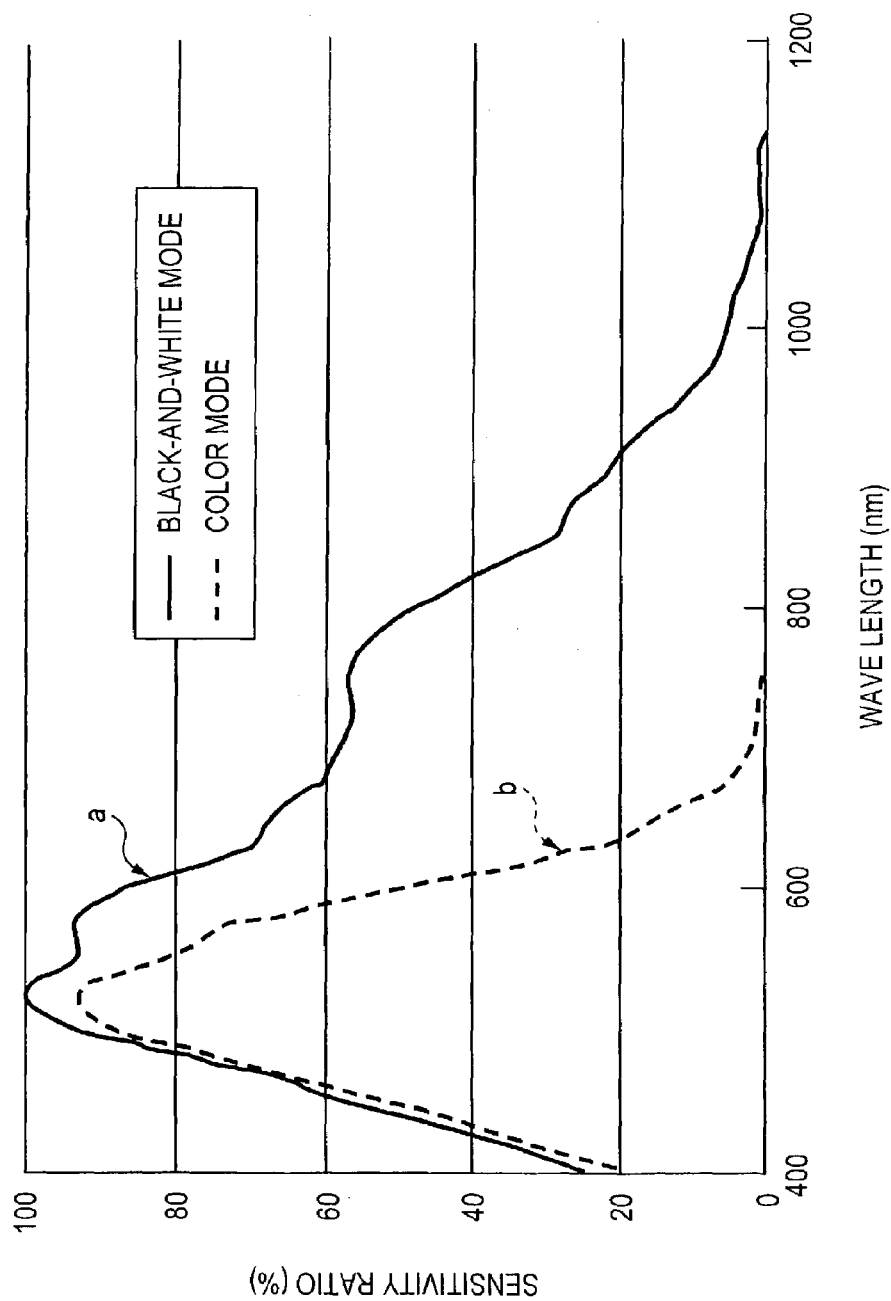
FIG. 6 is a diagram showing the sensitivity characteristics of the CCD image pick-up element.

In the Drawings, on Sheet 6 of 6, after "FIG. 6", please insert --RELATED ART--

Column 6, Line 61, pelase delete "causing" and insert --a using--.

Signed and Sealed this

Twenty-first Day of November, 2006

JON W. DUDAS
*Director of the United States Patent and Trademark Office*